United States Patent [19]
Foss et al.

[11] Patent Number: 5,386,794
[45] Date of Patent: Feb. 7, 1995

[54] TIRE PRESSURE INDICATOR

[75] Inventors: Arthur J. Foss, Mesa, Ariz.; Philip J. Milanovich, 2450 S. 4th Ave., Yuma, Ariz. 85364

[73] Assignee: Philip J. Milanovich, Butte, Mont.

[21] Appl. No.: 24,451

[22] Filed: Mar. 1, 1993

[51] Int. Cl.6 .............................................. B60C 23/06
[52] U.S. Cl. .................................................. 116/34 R
[58] Field of Search ................. 116/34 R, 266, 270, 116/272; 73/146.8

[56] References Cited

U.S. PATENT DOCUMENTS

| | | | |
|---|---|---|---|
| 1,450,769 | 4/1923 | Crosby | 116/34 R |
| 2,417,449 | 3/1947 | Rubin | 116/34 R |
| 2,704,045 | 3/1955 | Riesing | 116/34 |
| 2,903,888 | 9/1959 | Gfoll | 116/34 R |
| 3,276,417 | 10/1966 | Flowers | 116/34 R |
| 3,380,427 | 4/1968 | Rubin | 73/146.8 |
| 3,492,968 | 2/1970 | Workman, Jr. | 116/270 |
| 3,799,037 | 3/1974 | Schmidt | 73/146.8 X |
| 4,520,664 | 6/1985 | Kramer | 116/34 R X |
| 4,606,391 | 8/1986 | Achterholt | 152/431 |
| 4,708,169 | 11/1987 | Liu | 116/34 R X |
| 5,007,365 | 4/1991 | Hwang | 116/34 R |
| 5,025,244 | 6/1991 | Huang | 116/34 R X |
| 5,027,740 | 7/1991 | Kramer et al. | 116/34 R |

FOREIGN PATENT DOCUMENTS 1042406  10/1958  Germany .................. 73/146.8

*Primary Examiner*—William A. Cuchlinski, Jr.
*Assistant Examiner*—John L. Beres
*Attorney, Agent, or Firm*—Jacobson, Price, Holman & Stern

[57] ABSTRACT

A qualitative indication of the pressure in a pneumatic tire is provided by a sliding marker in a sleeve. The marker moves in a chamber formed by a hollow lens closing one end of the sleeve and a diaphragm within the sleeve. A spring forces the marker toward the diaphragm and air pressure from the tire is applied to the opposite side of the diaphragm from the marker. A pressure above a predetermined amount is indicated by the end of the marker substantially filling the hollow lens and a pressure below the predetermined amount is indicated by the end of the marker withdrawing into the sleeve.

7 Claims, 1 Drawing Sheet

TIRE PRESSURE INDICATOR

BACKGROUND OF THE INVENTION

This invention relates to a tire pressure indicator and, in particular, to a tire pressure indicator for providing an easily viewed, qualitative indication of the air pressure within a pneumatic tire.

The motoring public is generally aware of the need to have tires properly inflated for optimum tire life and performance. Under-inflated tires wear more quickly and degrade the handling characteristics of a car. The problem is that the tedium of measuring the pressure in each tire causes many motorists to forego measuring the pressure in the tires and rely on a visual inspection instead. A visual inspection is inadequate, particularly when a car is equipped with radial tires, because a sidewall bulge is present even in properly inflated tires.

In the prior art, a number of qualitative indicators have been proposed for inclusion in the valve cap on each wheel. In general, these devices are relatively expensive to manufacture and difficult to read. One source of the difficulty is that the valve stem points from the rim of the wheel in such a way that the motorist is generally looking at the end of the cap, which typically has a diameter of one quarter of an inch or less. Another source of the difficulty is that the wheel can come to rest with the valve stem at any position, e.g. top center, bottom center, or anywhere in between. The result is that the indicator is often at an awkward angle for reading and must be read from a short distance, e.g. a couple of feet.

U.S. Pat. No. 4,606,931—Achterholt—discloses a valve cap with a pressure drop indicator in which a diaphragm moves a sliding indicator inward through the valve cap. A blade like marking member within the indicator remains extended when the indicator moves inward to show that the pressure has dropped within the tire. The blade is contained within a transparent end cap and must be positioned correctly for someone to see either side of the blade rather than an edge.

U.S. Pat. Nos. 4,601,254—Huang et al.—and 3,164,125—Stuart—disclose valve caps with frangible end portions for indicating low pressure. Once the end portions break, the indicator must be replaced and the motorist is without an indicator until the spent valve cap is replaced.

U.S. Pat. Nos. 2,704,045—Riesing, 3,208,425—Jousma et al., 3,380,427—Rubin, and 3,780,693—Parr each disclose a pressure indicator in which a marker is viewed through a small port in the indicator. As with the indicator of Achterholt, the viewing angle is often awkward because of the rotational position of the indicator on the wheel. The Rubin patent discloses a gauge which is at a right angle to the longitudinal axis of the valve stem. Nevertheless, the tire must be rotated to the correct position in order to see the indicia on the gauge.

In view of the foregoing, it is therefore an object of the invention to provide a qualitative pressure indicator for a pneumatic tire in which the indicator can be read irrespective of the rotational position of the tire.

Another object of the invention is to provide a pressure indicator for a pneumatic tire in which a qualitative display can be seen from all angles through a transparent cap.

SUMMARY OF THE INVENTION

The foregoing objects are achieved in the invention in which a housing includes a first sleeve abutting on a second sleeve at approximately the midpoint of the second sleeve. The hollow interiors of the first and second sleeves are interconnected by a hole in the wall of the second sleeve. The second sleeve is attached to the filler valve of a wheel and contains an extension for the stem of the valve. An elongated, movable marker within the first sleeve is moved in one direction by a diaphragm covering the hole in the wall of the second sleeve and is moved in the opposite direction by a spring. The open end of the first sleeve is closed by a hollow lens and a skirt attached to the lens extends into the first sleeve to seal the periphery of the diaphragm against the second sleeve. The marker is moved by the diaphragm into the lens to indicate adequate air pressure and is moved out of the lens by the spring when the air pressure is below a predetermined amount, determined by the restoring force of the spring and the diameter of the first sleeve. The coloring of the end of the marker greatly changes the appearance of the lens as the marker moves from the first position to the second position. The compliance of the spring and the diameter of the marker determine the pressure at which the diaphragm overcomes the force of the spring and moves the marker into the second position.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
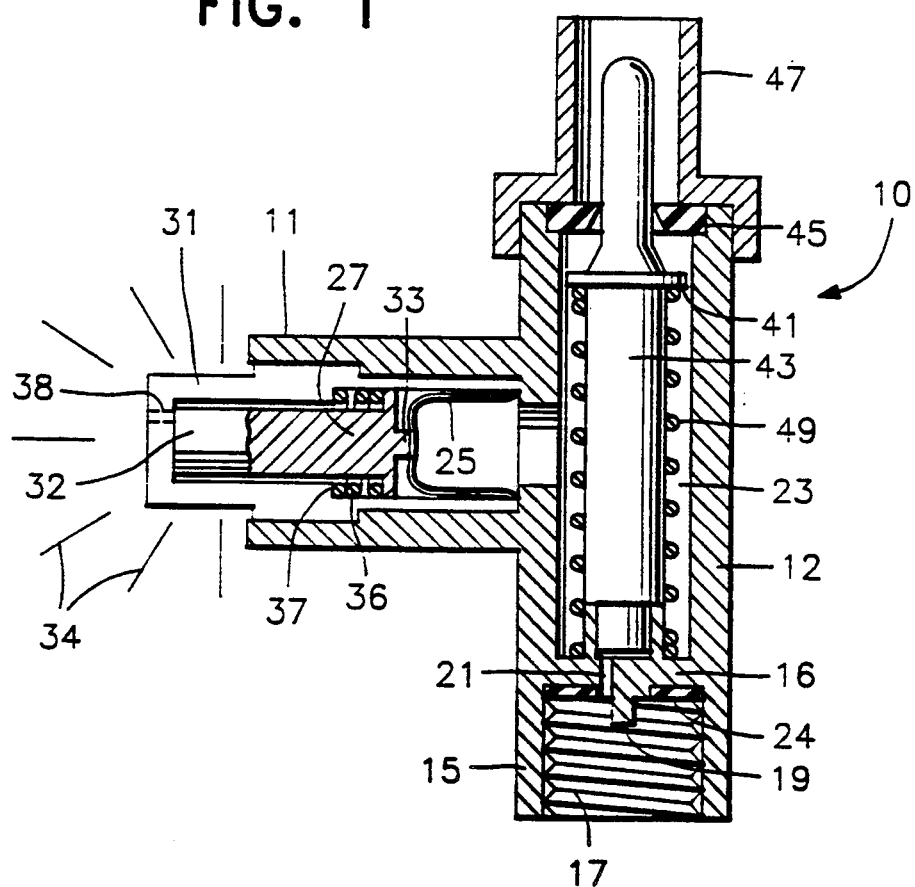
FIG. 1 is a cross-sectional view of a tire pressure indicator constructed in accordance with the invention and showing a high pressure condition.

FIG. 1 illustrates a preferred embodiment of a tire pressure indicator in which first sleeve 11 abuts on second sleeve 12 at approximately the midpoint of second sleeve 12, with the longitudinal axes of the sleeves orthogonal. The hollow interiors of the sleeves are connected through hole 13 in the wall of sleeve 12. While described as separate sleeves, it is understood by those of skill in the art that the body of the pressure indicator can be made as a single piece.

End 15 of sleeve 12 is separated from the remainder of the sleeve by transverse interior wall 16. Indicator 10 is attached to the filler valve of a wheel (not shown) by internal thread 17 within end 15. Button 19 on wall 16 engages the valve stem of the filler valve on the wheel and presses it inwardly to release air from the tire into indicator 10. Air passes from the wheel through passageway 21 in wall 16 into chamber 23. Although only one passageway is shown, a number of passageways can be provided to avoid unduly restricting the flow of air to or from the wheel. The upper portion of the filler valve engages gasket 24 to seal the upper end of the filler valve within end 15 of indicator 10.

Air from the wheel passes from chamber 23 through hole 13. Diaphragm 25 is sealed across hole 13, separating the interior of sleeve 11 from the interior of sleeve 12. Diaphragm 25 can be any suitable, flexible material such as an elastomeric disk. The diaphragm is corrugated or contoured to increase the amount that the diaphragm can expand without rupture.

Lens 31 is cup shaped, with the rim of the cup attached to the end of sleeve 11. End 32 of marker 27 has a shape complementary to the interior of lens 31; that is, end 32 substantially fills the hollow interior of lens 31 and the surfaces of end 32 are very close to or touching the inside of lens 31 when the pressure in the tire is greater than a predetermined amount. Lens 31 is preferably a transparent plastic. Because end 32 extends past the end of sleeve 11, end 32 is clearly visible, through lens 31, in all directions in a hemisphere centered on lens 31, as indicated by rays 34.

In a preferred embodiment of the invention, lens 31 includes skirt 35 lining the inside of sleeve 11 and press-fit or glued to the interior sleeve 11. The end of skirt 35 seals the periphery of diaphragm 25 against the edge of hole 13. Marker 27 fits within skirt 35 as shown. At the inner end of marker 27, button 33 extends toward diaphragm 25 to make contact with the surface of diaphragm 25 to assure that diaphragm 25 folds correctly upon contraction and to assure that diaphragm 25 is in contact with button 33 at all times. Surrounding marker 27 is spring 36 which extends from shoulder 37 on skirt 35 to flange 39 on marker 27. Spring 36 is held in compression between shoulder 37 and flange 39 and opposes the force applied by diaphragm 25.

Subject to the forces imposed by the diaphragm and spring, marker 27 is freely movable longitudinally within sleeve 11; i.e. the marker does not fit tightly within the sleeve or skirt. If the air pressure within chamber 23 is sufficient to overcome the force of spring 36, then marker 27 is moved to the left, as shown in FIG. 1, indicating adequate air pressure in the tire. The particular pressure at which spring 36 is overcome is preferably about thirty-five pounds per square inch. The pressure can be changed by changing the restoring force of the spring. Vent 38 keeps the air pressure within lens 31 at atmospheric pressure.

FIG. 1 also illustrates the operation of the indicator when air is either being supplied to a tire or removed from a tire. Specifically, valve stem 43 is pushed against spring 49, there by opening the upper end of chamber 23 for either releasing air from the tire or supplying more air to the tire. Since air is typically supplied to a tire at a pressure considerably greater than thirty-five pounds per square inch, marker 27 is in the left most position. If valve stem 43 were pressed downward to release air from a tire, then marker 27 would stay to the right as long as a low pressure condition existed in chamber 23.

When valve stem 43 is not pushed downward, chamber 23 is sealed at its upper end by flange 41 of valve stem 43 pressing against gasket 45 due to the force supplied by spring 49. Valve cap 47 is attached to the upper end of sleeve 12, holding gasket 45 and valve stem 43 in place.

Figure 2:
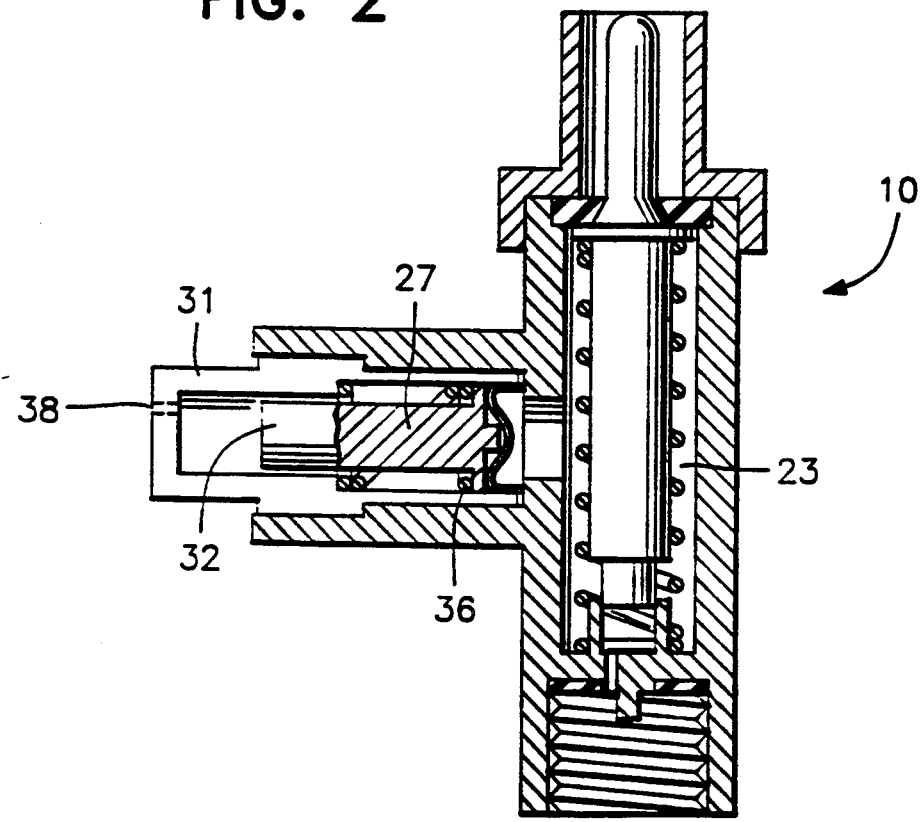
FIG. 2 is a cross-sectional view of a tire pressure indicator constructed in accordance with the invention and showing a low pressure condition.

FIG. 2 illustrates tire pressure indicator 10 showing a low pressure condition. when the air pressure within chamber 23 is less than the predetermined amount, then marker 27 is pushed to the right by spring 36. Outer end 32 of marker 27 is withdrawn into sleeve 11, producing a distinctly different image from the lens shown in FIG. 1. For example, if lens 31 is transparent or lightly frosted, the lens has a gray or white appearance. When end 32 is in lens 31, the appearance of the lens is distinctly altered, depending upon the color of end 32. Thus, marker 27 provides a qualitative indication of whether or not the air pressure within a tire is above a predetermined amount.

The presence or absence of marker 27 is detectable whether lens 31 is viewed end-on or from any angle around the longitudinal axis of sleeve 11. Thus, a wheel can come to rest with the filler valve at any position and the indicator can be read accurately to determine whether or not the tires have sufficient air pressure.

The present invention thus provides an easily read, qualitative indication of pressure within a pneumatic tire. The construction of the indicator is less expensive than indicators of the prior art and is sufficiently substantial to withstand the hostile environment of streets and highways in all weather. A motorist can quickly check all of the tires while walking toward or standing near the vehicle.

Having thus described the invention, it will be apparent to those of skill in the art that various modifications can be made within the scope of the invention. For example, the predetermined pressure at which the marker moves depends upon the tire. Light truck tires, for example, typically run at a slightly higher pressure than automotive tires, e.g. forty pounds per square inch, and would use an indicator of a different color from an indicator for automotive tires. The material from which the indicator is made is not critical. The housing for the indicator is preferably polycarbonate, although any rigid plastic which can retain threads can be used instead. The lens is preferably made from acrylic, which is optically clear and U.V. stable. Other plastics meeting these criteria can be used instead. The valve stem is preferably made from aluminum. While the marker is shown and described as a solid cylinder or rod, the middle portion of the marker can have any desired shape, e.g. a cylindrical end and a disc interconnected by a narrow rod. The cylindrical end fills the interior of the lens and the disc or flange is used to pull the cylindrical end out of the lens when the air pressure drops. Diaphragm 25 can be attached to the interior of sleeve 12 instead of the exterior. The lens can be lightly colored, preferably a color complementary to the color of the end of the marker, or lightly frosted. The lens could partially surround, rather than line, the sleeve.

I claim:

1. A pressure indicator for a pneumatic tire, said tire having a filler valve with a threaded end, said indicator comprising:
   a first sleeve having a first end and a second end;
   an expandable diaphragm connected across and closing said second end;
   a lens attached to said first end, said lens having a hollow interior;
   a movable marker fitting within said sleeve and said lens, said marker having a first end and a second end, wherein said first end of said marker has a shape complementary to said interior and said marker substantially fills said interior when the air pressure in said tire exceeds a predetermined amount;
   a spring for moving said marker within said first sleeve in a direction away from said lens;
   wherein said diaphragm applies a force to aid marker in a direction toward said lens in accordance with the air pressure within said tire when said sleeve is coupled to said threaded end of said filler valve;

a second sleeve for coupling said first sleeve to said threaded end or said filler valve, wherein said second end of said first sleeve abuts on said second sleeve and said second sleeve has a hole where said second end of said first sleeve abuts on said second sleeve;

wherein said first sleeve is approximately orthogonal to said second sleeve;

wherein said lens includes a skirt fitting within and partially lining said sleeve, wherein said marker fits within said skirt; and wherein said skirt has a first end and said diaphragm is held between said first end of said skirt and said second sleeve.

2. The indicator as set forth in claim 1 wherein said second sleeve has a first end and a second end, wherein said first end of said second sleeve is threaded for attaching to said threaded end of said filler valve.

3. The indicator as set forth in claim 1 wherein said second sleeve includes a transverse interior wall near said first end of said second sleeve.

4. The indicator as set forth in claim 3 and further comprising a button on said transverse interior wall and at least one passageway through said wall, wherein said button is positioned to open said filler valve and said passageway permits air to flow to said diaphragm from said filler valve.

5. The indicator as set forth in claim 1 wherein said lens is transparent.

6. The indicator as set forth in claim 1 wherein said lens is frosted.

7. The indicator as set forth in claim 1 wherein said lens is vented.

* * * * *